United States Patent [19]

Richards et al.

[11] Patent Number: 5,324,769
[45] Date of Patent: Jun. 28, 1994

[54] THERMALLY STABLE BLENDS OF POLYPHENYLENE ETHER, DIENE BASED RUBBER AND AN ANTIOXIDANT/METAL DEACTIVATOR

[75] Inventors: William D. Richards, Scotia; James F. Kelley, Troy, both of N.Y.

[73] Assignee: General Electric Company, Schenectady, N.Y.

[21] Appl. No.: 140,945

[22] Filed: Oct. 25, 1993

Related U.S. Application Data

[60] Division of Ser. No. 850,371, Mar. 12, 1992, which is a continuation of Ser. No. 628,810, Dec. 17, 1990, abandoned.

[51] Int. Cl.⁵ .................... C08L 71/12; C08L 25/10; C08K 5/00
[52] U.S. Cl. .................... 524/505; 524/504; 524/508; 524/540; 525/68; 525/92; 525/152; 525/905
[58] Field of Search .............. 524/504, 505, 508, 540; 525/68, 92, 152, 905

[56] References Cited

U.S. PATENT DOCUMENTS

| | | | |
|---|---|---|---|
| 3,994,856 | 11/1976 | Katchman et al. | 525/92 |
| 4,104,323 | 8/1978 | Hansen | 524/505 |
| 4,184,999 | 1/1980 | Olander | 525/192 |
| 4,252,913 | 2/1981 | Katchman et al. | 525/92 |
| 4,283,503 | 8/1981 | Wright | 525/89 |
| 4,341,879 | 7/1982 | Sugio et al. | 525/68 |
| 4,491,649 | 1/1985 | Falk et al. | 525/92 |
| 4,547,541 | 10/1985 | Golba, Jr. | 525/92 |
| 4,892,904 | 1/1990 | Ting | 524/494 |
| 5,001,201 | 3/1991 | Brown | 525/92 |
| 5,039,742 | 8/1991 | Brown et al. | 525/92 |
| 5,096,979 | 3/1992 | Brown et al. | 525/396 |
| 5,102,591 | 4/1992 | Hasson et al. | 525/132 |

FOREIGN PATENT DOCUMENTS 0264101 10/1987 Japan.
0319339 12/1988 Japan.

*Primary Examiner*—James J. Seidleck
*Assistant Examiner*—Thomas Hamilton, III
*Attorney, Agent, or Firm*—William A. Teoli; William H. Pittman

[57] ABSTRACT

There are provided melt extruded blends of diene based rubber and preextruded polyphenylene ether, or blends thereof with an effective amount of a stabilizer such as a hindered phenol or metal deactivator/hindered phenol. The resulting polyphenylene ether composition can be further extruded with a polymeric organic matrix material, such as a polyamide or polyetherimide. When molded, the polyphenylene ether compositions have been found to resist loss of impact strength upon thermal aging and recycling.

6 Claims, No Drawings

THERMALLY STABLE BLENDS OF POLYPHENYLENE ETHER, DIENE BASED RUBBER AND AN ANTIOXIDANT/METAL DEACTIVATOR

This application is a division of application Ser. No. 07/850,371, filed Mar. 12, 1992 which is a continuation of Ser. No. 07/628,810, filed Dec. 17, 1990.

REFERENCE TO COPENDING APPLICATIONS

Reference is made to copending applications 07/628,809, now abandoned and 07/628,811, now abandoned, filed concurrently herewith and assigned to the same assignee as the present invention.

BACKGROUND OF THE INVENTION

The present invention relates to blends comprising polyphenylene ether and diene based rubber which exhibit improved resistance to loss of impact strength when the blends have been molded and thereafter thermally recycled. More particularly, the present invention relates to blends of diene based rubber and polyphenylene ether, where the polyphenylene ether used in the blend has been previously extruded, prior to melt extrusion with the diene based rubber.

Prior to the present invention, antioxidants, such as hindered phenols, were often used as stabilizers for polyphenylene ethers, while metal deactivators/antioxidants were frequently employed to reduce metal catalyzed degradation in unsaturated rubber. Commercially available stabilizers have been used with butadiene copolymers, such as Kraton KD1102 manufactured by Shell Chemical Company, which is a styrene-butadiene-styrene (SBS) block copolymer. Antioxidants also have been found to minimize crosslinking of diene based rubber resulting from oxidation during high temperature processing. In the event of excessive crosslinking prior to or during molding, diene based rubber can become ineffective as an impact modifier for thermoplastics, such as polyphenylene ether.

Although metal deactivators and/or antioxidants have been found effective for stabilizing diene based rubber, experience has shown that blends of such stabilized diene based rubber and polyphenylene ether which have been molded, often experience a reduction in toughness when thermally recycled, as compared to the blend when initially molded. One possible explanation is that crosslinking occurs in the diene blocks of the impact modifier during the subsequent melt extrusion steps of the recycled thermoplastic, and the toughness of the molded thermoplastic is reduced. Metal residues such as copper in the polyphenylene ether also can catalyze the crosslinking of the unsaturated rubber. Accordingly, in order to maintain the impact properties of molded blends of polyphenylene ether and diene based rubber subject to recycling, additional methods to improve the thermal stability of the diene based rubber subject to recycling are constantly being sought.

SUMMARY OF THE INVENTION

The present invention is based on the discovery that the thermal stability of the diene blocks in diene based rubber which has been melt extruded with polyphenylene ether can be substantially improved, if the diene based rubber is melt extruded with polyphenylene ether which has been previously melt extruded either alone, or in combination with an antioxidant, or metal deactivator/antioxidant. The melt extrusion of the diene based rubber with the previously melt extruded polyphenylene ether can be achieved by either direct contact between the aforementioned ingredients under melt extrusion conditions, or by "down stream" addition in an extruder where virgin polyphenylene ether is initially introduced, melt extruded and conveyed down stream before contact with the diene based rubber and optionally with matrix material as defined hereinafter.

A convenient technique for determining the degree of change in the crosslink density of diene based rubber is by the use of dynamic mechanical analysis. The temperature of the loss peak associated with the glass transition temperature of the rubber can be measured. An increase in the glass transition of the rubber indicates an increase in crosslink density. To be effective as an impact modifier, diene based rubber must have a glass transition temperature which is well below the temperature at which the impact occurs in the molded article, or in the recycled molded article.

STATEMENT OF THE INVENTION

There is provided by the present invention, a polyphenylene ether composition which has enhanced impact strength when initially molded and which resists loss of impact strength upon being subjected to recycling conditions at temperatures in the range of 250° C.-350° C., or thermal aging conditions over a temperature in the range of 50° C.-200° C., comprising by weight, from about 5 to 400 parts of a diene based rubber, per 100 parts of a polyphenylene ether, which polyphenylene ether composition is an extrudate of a melt extruded mixture of a member selected from the class consisting of (a) a blend of a diene based rubber and extruded polyphenylene ether, (b) a blend of a diene based rubber and an extruded blend of polyphenylene ether and an effective amount antioxidant/metal deactivator, and (c) a blend of a diene based rubber and an extruded blend of polyphenylene ether and an effective amount of an antioxidant.

Polyphenylene ethers which can be used in the practice of the invention, are widely used in industry, especially as engineering thermoplastics in applications requiring toughness and heat resistance. Since their discovery, they have given rise to numerous variations and modifications all of which are applicable to the present invention, including but not limited to those described hereinafter.

The polyphenylene ethers comprise a plurality of structural units having the formula,

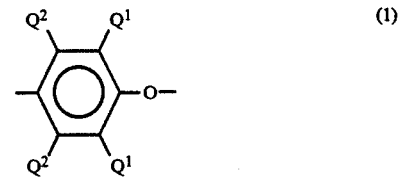

(1)

wherein each of said units, each $Q^1$ is a primary or secondary lower alkyl (i.e., alkyl containing up to 7 carbon atoms), phenyl or hydrocarbonoxy and each $Q^2$ is independently hydrogen, halogen, primary or secondary lower alkyl, phenyl or hydrocarbonoxy as defined by $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-,3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen.

Both homopolymer and copolymer polyphenylene ethers are included. Suitable homopolymers are those containing, for example, 2,6-dimethyl-1,4-phenylene ether units.

The polyphenylene ethers can have a number average molecular weight within the range of about 3,000–40,000 and a weight average molecular weight within the range of about 20,000–80,000, as determined by gel permeation chromatography. Their intrinsic viscosities are most often in the range of about 0.2–0.6 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874; 3,306,875; 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (monomeric and polymeric), o-hydroxyaryl oximes and β-diketones. Also useful are known cobalt-containing catalyst systems. Suitable manganese and cobalt-containing catalyst systems for polyphenylene ether preparation are known in the art by reason of disclosure in numerous patents and publications.

Particularly useful polyphenylene ethers are those which comprise molecules having at least one of the end groups of the formulas

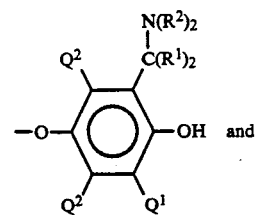 (2)

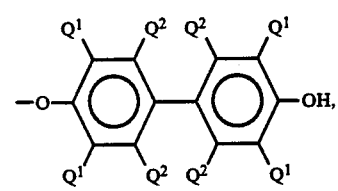 (3)

wherein $Q^1$ and $Q^2$ are as previously defined; each $R^1$ is independently hydrogen or alkyl, with the proviso that the total number of carbon atoms in both $R^1$ radicals is 6 or less; and each $R^2$ is independently hydrogen or a $C^{1-6}$ primary alkyl radical. Preferably, each $R^1$ is hydrogen and each $R^2$ is alkyl, especially methyl or n-butyl.

Polymers containing the aminoalkyl-substituted end groups of formula 2 may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals. The principal site of reaction is the $Q^1$ radical adjacent to the hydroxy group on the terminal unit of the polymer chain. During further processing and/or blending, the aminoalkyl-substituted end groups may undergo various reactions, probably involving a quinone methide-type intermediate of the formula

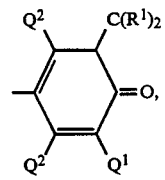 (4)

with numerous beneficial effects often including an increase in impact strength and compatibilization with other blend components, Reference is made to U.S. Pat. Nos. 4,054,553; 4,092,294; 4,477,649; 4,477,651 and 4,517,341, the disclosures of which are incorporated by reference herein. Polymers with 4-hydroxybiphenyl end groups of formula (3) are typically obtained from reaction mixtures in which a byproduct diphenoquinone of the formula,

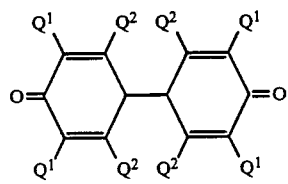 (5)

is present, especially in a copper-halide-secondary or tertiary amine system. In this regard, the disclosure of U.S. Pat. No. 4,477,649 is again pertinent as are those of U.S. Pat. No.4,234,706 and 4,482,697, which are also incorporated by reference herein. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulas 2 and 3. It should be understood however, that other end groups may be present and that the invention in its broadest sense may not be dependent on the molecular structures of the polyphenylene ether end groups.

The term "diene based rubber", as used hereinafter, means rubber having unsaturated double bonds and includes for example, butadiene based rubber which is preferred, and isoprene based rubber.

The diene based rubber impact modifiers for polyphenylene ether compositions are well known in the art. They are typically derived from one or more monomers selected from the group consisting of olefins, vinyl aromatic monomers, acrylic and alkylacrylic acids and their ester derivatives in combination with conjugated dienes. Especially preferred impact modifiers are the rubbery high-molecular weight materials including natural and synthetic polymeric materials showing elasticity at room temperature. They include both homopolymers and copolymers, including random, block, radial block, graft and core-shell copolymers as well as combinations thereof.

In combination with diene based rubber, there can be used polyolefins or olefin-based copolymers, such as poly(1-butene), poly(4-methyl-1-pentene), propyleneethylene copolymers and the like.

A particularly useful class of materials which can be used with or as diene based rubber are those derived from the vinyl aromatic monomers. These include, for example, modified polystyrenes, ABS type graft copolymers, AB and ABA type block and radial block copolymers and vinyl aromatic conjugated diene coreshell graft copolymers. Modified polystyrenes include rubber modified polystyrenes, such as butadiene rubbermodified polystyrene (otherwise referred to as high impact polystyrene or HIPS). Additional useful polystyrenes include copolymers of styrene and various monomers, including, for example, poly(styreneacrylonitrile) (SAN), styrene-butadiene copolymers as well as the modified alpha- and para-substituted styrenes and any of the styrene resins disclosed in U.S. Pat. No. 3,383,435, herein incorporated by reference. ABS types of graft copolymers are typified as comprising a rubbery polymeric backbone derived from a conjugated diene alone or in combination with a monomer copolymerizable therewith having grafted thereon at least one monomer, and preferably two, selected from the group consisting of monoalkenylarene monomers and substituted derivatives thereof as well as acrylic monomers such as acrylonitriles and acrylic and alkylacrylic acids and their esters.

An especially preferred subclass of vinyl aromatic monomer-derived resins is the block copolymers comprising monoalkenyl arene (usually styrene) blocks and conjugated diene (e.g., butadiene or isoprene) blocks and represented as AB and ABA block copolymers.

Suitable AB type block copolymers are disclosed in, for example, U.S. Pat. Nos. 3,078,254; 3,402,159; 3,297,793; 3,265,765 and 3,594,452 and UK Patent 1,264,741, all incorporated herein by reference. Examples of typical species of AB block copolymers are polystyrene-polybutadiene (SBR), polystyrene-polyisoprene and poly(alphamethylstyrene)-polybutadiene. Such AB block copolymers are available commercially from a number of sources, including Phillips Petroleum under the trademark SOLPRENE.

Examples of triblock copolymers include polystyrene-polybutadiene-polystyrene (SBS), polystyrenepolyisoprene-polystyrene (SIS), poly($\alpha$-methylstyrene)polybutadiene-poly-($\alpha$-methylstyrene) and poly($\alpha$-methylstyrene)-polyisoprene-poly-($\alpha$-methylstyrene). Particularly preferred triblock copolymers are available commercially as CARIFLEX®, and KRATON D® from Shell. Reference also is made to Kambour, U.S. Pat. No. 3,639,508 which is incorporated herein by reference.

Another class of impact modifiers is derived from conjugated dienes. While many copolymers containing conjugated dienes have been discussed above, additional conjugated diene modifier resins include, for example, homopolymers and copolymers of one or more conjugated dienes including, for example, polybutadiene, butadiene-styrene copolymers, butadiene-glycidyl methacrylate copolymers, isoprene-isobutylene copolymers, chlorobutadiene polymers, butadieneacrylonitrile copolymers, polyisoprene, and the like. Ethylene-propylene-diene monomer rubbers may also be used. These EPDM's are typified as comprising predominantly ethylene units, a moderate amount of propylene units and up to about 20 mole percent of non-conjugated diene monomer units. Many such EPDM's and processes for the production thereof are disclosed in U.S. Pat. Nos. 2,933,480; 3,000,866; 3,407,158; 3,093,621 and 3,379,701, incorporated herein by reference.

Other suitable impact modifiers are the core-shell type graft copolymers. In general, these have a predominantly conjugated diene rubbery core and one or more shells polymerized thereon and derived from monoalkenylarene and/or acrylic monomers alone or, preferably, in combination with other vinyl monomers.

The preferred diene based rubbers are block (typically diblock, triblock or radial teleblock) copolymers of alkenylaromatic compounds and dienes or a mixture of dienes and olefins. Most often, at least one block is derived from styrene and at least one other block from at least one of butadiene or isoprene. Especially preferred are the triblock copolymers with polystyrene end blocks dienederived midblocks. The weight average molecular weights of the impact modifiers are typically in the range of about 50,000–300,000. Block copolymers of this type are commercially available from Shell Chemical Company under the trademark KRATON, and include KRATON D1101, and D1102.

Some of the stabilizers which can be used in the practice of the present invention can be used at from 0.1 to 5 parts by weight of stabilizer, per 100 parts polyphenylene ether. There are included Irganox 1076 of the Ciba Geigy Company having the formula,

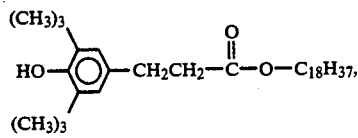

Ultranox 257, of the GE Company having the formula,

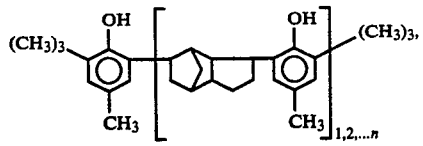

Seenox 412S, of the Argus Chemical Company,

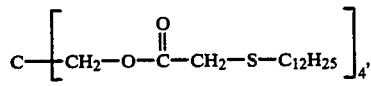

Irganox MD-1024, of the Ciba Geigy Company having the formula,

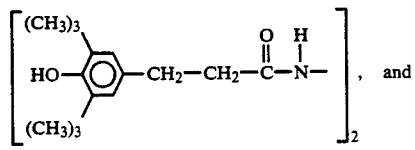

Naugard XL-1, of the Uniroyal Chemical Company having the formula,

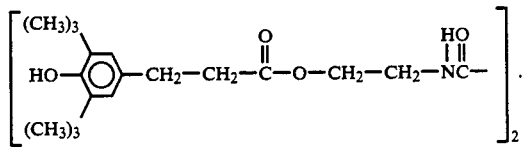

The thermally stable blends of polyphenylene ether and diene based rubber can be made by melt blending, and preferably melt extruding, the ingredients at temperatures of from 250° C. to 350° C. The resulting blend can be pelletized and thereafter blended with organic polymeric matrix materials, such as a polyamide, a polyester, a polystyrene or a polyetherimide. Dry blending followed by melt extrusion at the aforementioned temperatures also will provide effective results. As previously indicated, additional procedures can include "down stream feeding" where the matrix material and/or the diene based rubber can be added to the extruder following the earlier melt extrusion of the polyphenylene ether.

A proportion of from about 60 to 200 parts by weight of matrix material per 100 parts of polyphenylene ether will provide effective results.

Polyamides suitable as matrix material in the preparation of the compositions of this invention may be made by any known method, including the polymerization of a monoamino-monocarboxylic acid or a lactam thereof having at least 2 carbon atoms between the amino and carboxylic acid group, of substantially equimolar proportions of a diamine which contains at least 2 carbon atoms between the amino groups and a dicarboxylic acid, or of a monoaminocarboxylic acid or a lactam thereof as defined above together with substantially equimolar proportions of a diamine and a dicarboxylic acid. (The term "substantially equimolar" proportions includes both strictly equimolar proportions and slight departures therefrom which are involved in conventional techniques for stabilizing the viscosity of the resultant polyamides.) The dicarboxylic acid may be used in the form of a functional derivative thereof, for example, an ester or acid chloride.

Examples of the aforementioned monoaminomonocarboxylic acids or lactams thereof which are useful in preparing the polyamides include those compounds containing from 2 to 16 carbon atoms between the amino and carboxylic acid groups, said carbon atoms forming a ring with the —CO—NH— group in the case of a lactam. Particular examples of aminocarboxylic acids and lactams are ε-aminocaproic acid, butyrolactam, pivalolactam, ε-caprolactam, capryllactam, enantholactam, undecanolactam, dodecanolactam and 3- and 4-aminobenzoic acids.

Diamines suitable for use in the preparation of the polyamides include the straight chain and branched chain alkyl, aryl and alkaryl diamines. Such diamines include, for example, those represented by the general formula

$$H_2N(CH_2)_nNH_2$$

wherein n is an integer of from 2 to 16. Illustrative diamines are trimethylenediamine, tetramethylenediamine, pentamethylenediamine, octamethylenediamine, hexamethylenediamine (which is often preferred), trimethylhexamethylenediamine, m-phenylenediamine and m-xylylenediamine.

The dicarboxylic acids may be represented by the formula

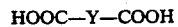

HOOC—Y—COOH wherein Y is a divalent aliphatic or aromatic group containing at least 2 carbon atoms. Examples of aliphatic acids are sebacic acid, octadecanedioic acid, suberic acid, glutaric acid, pimelic acid and adipic acid. Aromatic acids, such as isophthalic and terephthalic acids, are preferred.

In addition to polyamides, other matrix materials which can be used are polyetherimides which are shown by Heath et al, U.S. Pat. No. 3,847,867 incorporated herein by reference. Polyesters such as shown by U.S. Pat. No. 4,866,130 which is incorporated herein by reference also can be used.

These polyesters generally have number average molecular weights in the range of about 20,000–70,000, as determined by intrinsic viscosity (IV) at 30° C. in a mixture of 60% (by weight) phenol and 40% 1, 1,2,2-tetrachloroethane. When resistance to heat distortion is an important factor the polyester molecular weight should be relatively high, typically above about 40,000.

Such polyesters are ordinarily prepared by the reaction of at least one diol such as ethylene glycol, 1,4-butanediol or 1,4-cyclohexanedimethanol with at least one aromatic dicarboxylic acid such as isophthalic or terephthalic acid, or lower alkyl ester thereof. Poly(ethylene terephthalate) and poly(butylene terephthalate) are preferred.

In particular instances, polystyrene, also can be blended with polyphenylene ether and butadiene based rubber, at from 60 to 200 parts of polystyrene by, by weight, per 100 parts of polyphenylene ether.

In order that those skilled in the art will be better able to practice the present invention, the following examples are given by way of illustration and not by way of limitation. All parts are by weight.

EXAMPLE

Several blends of poly(2,6-dimethyl-1,4-phenylene ether) having an IV of about 0.4 dl/g in chloroform at 25° C. and Kraton KD1102, a styrene butadiene styrene (SBS) block copolymer of the Shell Chemical Company, were prepared using a 20 mm Welding Engineers twin screw extruder at a set temperature of 295° C. and a screw speed of 400 rpm. A proportion of 80/20 parts by weight of the polyphenylene ether to the SBS was used for the blends. Commercial stabilizers were added to some of the blends to determine their effect on the thermal stability of the butadiene based rubber. The blends were prepared by various methods. In one method, polyphenylene ether powder, SBS and the stabilizer were extruded simultaneously. In another method, the polyphenylene ether and stabilizer were extruded together and then reextruded with the SBS. In a third method, the polyphenylene ether was preextruded before it was extruded with the SBS, where the extrusion was effected free of commercial stabilizer. After extrusion, all of the blends were compression molded into bars for testing. Two different molding procedures were used to simulate mild and severe thermal histories. In a mild thermal history, samples were heated to 240° C. and held for 1 minute prior to quenching. Quenching was effected by introducing the sample in a molding press having platens at a temperature of about 20° C. For the severe thermal history, the samples were heated to 300° C. and held for 20 minutes prior to quenching.

The stability of the butadiene based rubber was determined by using dynamic mechanical analysis (DMA) to measure the temperature of the loss peak associated with the glass transition temperature of the rubber. Stabilizers which were tested were Irganox 1024, manufactured by the Ciba Geigy Company, and Naugard XL-1, made by the Uniroyal Chemical Company. These stabilizers functioned as antioxidant/metal deactivators. These antioxidant/metal deactivators were employed at various % by weight levels based on the weight of the SBS block copolymer. In addition to the aforementioned antioxidant/metal deactivators, additional stabilizers were evaluated which functioned as antioxidants in the SBS block copolymer and consisted of equal parts of Seenox 412S made by the Argus Chemical Company and Ultranox 257 a hindered phenol.

The following results were obtained, where in Table I, "PPE" is polyphenylene ether, KD1102 is the styrene-butadiene-styrene (SBS) block copolymer and square brackets indicate the material was preextruded.

TABLE I

| | | Rubber Transitions (°C.) | |
|---|---|---|---|
| | Blends | Mild Processing 1 min at 240° C. | Severe Processing 20 min at 300° C. |
| 1 | KD1102 | −80 | −54 |
| 2 | PPE/KD1102 | −60 | 25 to 40 |
| 3 | [PPE]/KD1102 | −75 | −20 to 2 |
| 4 | PPE/KD1102/Seenox 412S (0.5%)/ Ultranox 257 (0.5%) | −64 | 15 |
| 5 | PPE/KD1102/Seenox 412S (1.0%)/ Ultranox 257 (1.0%) | −61 | 5 |
| 6 | [PPE/Seenox 412S (1.0%)/ Ultranox 257 (1.0%)] KD1102 | −84 | −33 |
| 7 | PPE/KD1102 Irganox 1024 (1.5%) | −61 | −10 |
| 8 | PPE/KD1102 Irganox 1024 (3.0%) | −66 | −11 |
| 9 | PPE/KD1102 Naugard Xl-1 (1.5%) | −62 | 6 |
| 10 | [PPE/Naugard XL-1 (1.5%)]/KD1102 | −84 | −46 |
| 11 | [PPE/Irganox 1024 (1.5%)] /KD1102 | −84 | −35 |

The above results show that the KD1102 block copolymer exhibits much poorer thermal stability when blended with the polyphenylene ether than when processed alone. One possible explanation is that there are components in the polyphenylene ether which catalyze the crosslinking reaction of the butadiene block with KD1102. Additions of the stabilizers are shown to substantially reduce the increase in the rubber Tg during severe processing. The combination metal deactivator/antioxidant blends 7, 8, and 9 are shown to be about as effective as using an antioxidant alone (blends 4 and 5). The use of preextruded polyphenylene ether in blends 3, 6, 10 and 11 also show that enhanced stability can be achieved under both mild and severe processing conditions as compared to blends 2, 4, 5, 7, 8, and 9 where preextruded polyphenylene ether is not used. In 6, 10, and 11 where the polyphenylene ether is preextruded with the metal deactivator/antioxidant marked improvement in stability is obtained.

Additional evaluation of particular samples shown in Table I was made to determine their Notched Izod value under Mild Processing and Severe Processing conditions. Izod bars for impact testing were produced on an Engel 28 ton injection molding machine. For the mild process history, the samples were molded at 300° C. using an average residence time in the barrel of 2.2 minutes. For the severe process history, the samples were also molded at 300° C., but the residence time in the barrel was increased to 15 minutes by enlarging the cushion in front of the screw. The following results were obtained:

TABLE II

| Impact Performance of PPE/KD1102 Blends | | | |
|---|---|---|---|
| | Transition Temperature(°C.) | Notched Izod −29°C. | (ft-lb/in) 23° C. |
| Mild Processing | | | |
| PPE/KD1102 | −34 | — | 3.2 |
| PPE/KD1102 | −41 | 1.0 | 2.8 |
| PPE/KD1102 Seenox 412S (1%)/Ultranox 257 (1%) | −52 | 2.4 | 4.8 |
| [PPE]/KD1102 | −70 | 1.9 | 4.4 |
| [PPE/Seenox 412S (1%)/ Ultranox 257 (1%)] /KD1102 | −74 | 3.6 | 5.8 |
| [PPE/Naugard XL-1 (1.5%)] /KD1102 | −72 | 2.0 | 3.7 |
| Severe Processing | | | |
| PPE/KD1102 | 17 | — | 2.5 |
| PPE/KD1102 | −7 | 0.7 | 2.8 |
| PPE/KD1102 Seenox 412S (1%)/Ultranox 257 (1%) | −11 | 0.7 | 3.0 |

TABLE II-continued

Impact Performance of PPE/KD1102 Blends

| | Transition Temperature(°C.) | Notched Izod −29°C. | (ft-lb/in) 23° C. |
|---|---|---|---|
| [PPE]/KD1102 | −26 | 0.6 | 2.8 |
| [PPE/Seenox 412S (1%)/ Ultranox 257 (1%)] /KD1102 | −42 | 0.8 | 4.6 |
| [PPE/Naugard XL-1 (1.5%] /KD1102 | −40 | 0.7 | 3.5 |

Although the above example is directed to only a few of the very many variables which can be utilized in the practice of the present invention, it should be understood that the present invention is directed to a much broader variety of polyphenylene ethers, diene based rubbers and stabilizers as well as the use of matrix polymers, such as polyamides, polyaklyleneterephthalates and polyetherimides as set forth in the description preceding this example.

What is claimed is:

1. A polyphenylene ether composition which has enhanced impact strength when initially molded and which resists loss of impact strength upon being subjected to recycling conditions at temperatures in the range of 250° C.-350° C., or thermal aging conditions over a temperature in the range of 50° C.-200° C., comprising by weight, from about 5 to 400 parts of a diene based rubber, per 100 parts of a polyphenylene ether, which polyphenylene ether composition is an extrudate of a melt extruded mixture of a member selected from the class consisting of
   (a) a blend of a diene based rubber and an extruded blend of polyphenylene ether and an effective amount of an antioxidant/metal deactivator, and
   (b) a blend of a diene based rubber and an extruded blend of polyphenylene ether and an effective amount of an antioxidant.

2. A polyphenylene ether composition in accordance with claim 1, where the polyphenylene ether is poly(2,6-dimethyl-1,4-phenylene ether).

3. A polyphenylene ether composition in accordance with claim 1, where the diene based rubber is a styrene-butadiene-styrene block copolymer.

4. A polyphenylene ether composition in accordance with claim 1, which is an extrudate of a butadiene based rubber and an extruded blend of polyphenylene ether and an effective amount of a metal deactivator/hindered phenol.

5. A polyphenylene ether composition in accordance with claim 1, which is an extrudate of a butadiene based rubber and an extruded blend of a polyphenylene ether and an effective amount of an antioxidant.

6. A polyphenylene ether composition in accordance with claim 1, where the diene based rubber is isoprene.

* * * * *